(12) United States Patent
Belghoul et al.

(10) Patent No.: US 9,301,314 B2
(45) Date of Patent: Mar. 29, 2016

(54) WLAN AND LTE TIME DIVISION BASED SCHEDULING DEVICES AND METHODS

(71) Applicant: BROADCOM CORPORATION, Irvine, CA (US)

(72) Inventors: Farouk Belghoul, Campbell, CA (US); Kameswara Rao Medapalli, San Jose, CA (US)

(73) Assignee: Broadcom Corporation, Irvine, CA (US)

(*) Notice: Subject to any disclaimer, the term of this patent is extended or adjusted under 35 U.S.C. 154(b) by 200 days.

(21) Appl. No.: 14/089,602

(22) Filed: Nov. 25, 2013

(65) Prior Publication Data
US 2015/0098451 A1 Apr. 9, 2015

Related U.S. Application Data

(60) Provisional application No. 61/888,468, filed on Oct. 8, 2013.

(51) Int. Cl.
*H04W 4/00* (2009.01)
*H04W 72/12* (2009.01)
*H04W 88/06* (2009.01)

(52) U.S. Cl.
CPC .......... *H04W 72/1215* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 9,113,481 B2* | 8/2015 | Rimini | H04W 72/082 |
| 2012/0093009 A1* | 4/2012 | Wang | H04W 16/14 370/252 |
| 2012/0188907 A1* | 7/2012 | Dayal | H04W 72/1215 370/254 |
| 2012/0327913 A1* | 12/2012 | Wang | H04W 72/1215 370/336 |
| 2013/0039291 A1* | 2/2013 | Blankenship | H04L 5/001 370/329 |
| 2013/0070653 A1* | 3/2013 | Banister | H04W 56/0015 370/281 |
| 2013/0114517 A1* | 5/2013 | Blankenship | H04L 5/0053 370/329 |
| 2013/0242882 A1* | 9/2013 | Blankenship | H04W 72/0453 370/329 |
| 2013/0272170 A1* | 10/2013 | Chatterjee | H04W 28/02 370/280 |
| 2013/0324049 A1* | 12/2013 | Mujtaba | H04B 15/00 455/63.1 |
| 2014/0023041 A1* | 1/2014 | Zhao | H04W 36/0011 370/331 |
| 2014/0036810 A1* | 2/2014 | Harrison | H04W 72/042 370/329 |

* cited by examiner

*Primary Examiner* — Bob Phunkulh
(74) *Attorney, Agent, or Firm* — McDermott Will & Emery LLP

(57) ABSTRACT

A device with concurrent long-term evolution (LTE) and WLAN uplink transmission includes a WLAN transceiver coupled to an LTE transceiver via an interface. The LTE transceiver includes an LTE Layer-1 module that determines whether an LTE data downlink activity is scheduled for an LTE downlink sub-frame of an LTE time frame, based on information in a first portion of the LTE downlink sub-frame. When determination is made that the LTE data downlink activity is not scheduled for the LTE downlink sub-frame, a message may be communicated through the interface to notify the WLAN transceiver that the second portion of the LTE downlink sub-frame is available for WLAN communication. The LTE time frame includes multiple LTE downlink sub-frames each including the first portion and a second portion. The first portion provides the information that indicates whether the LTE data downlink activity is scheduled for the second portion of that LTE sub-frame.

20 Claims, 6 Drawing Sheets

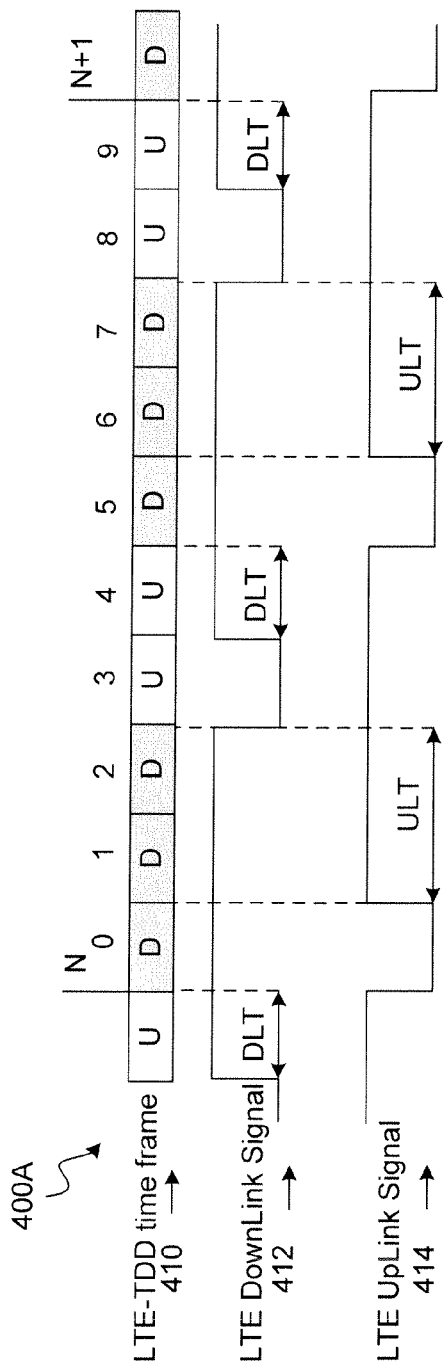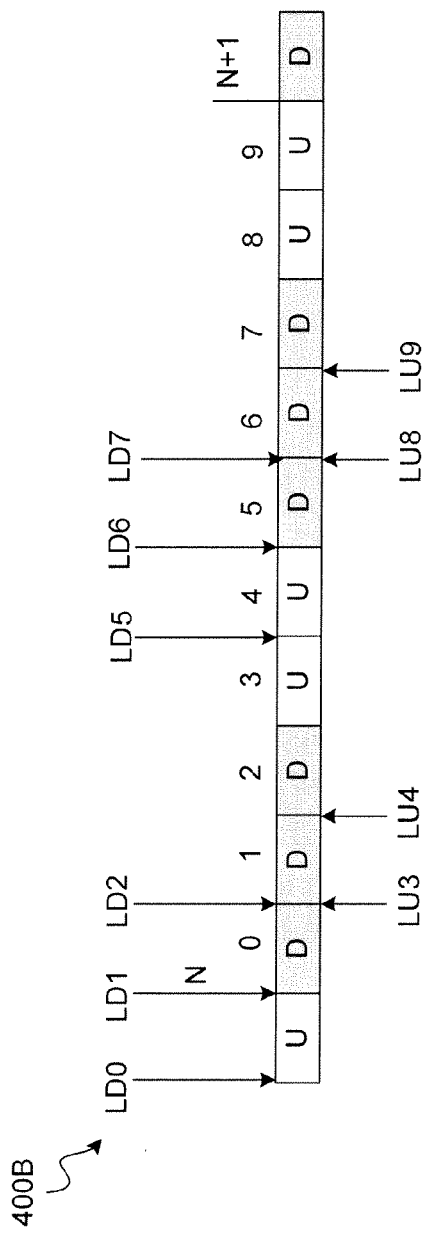

WLAN AND LTE TIME DIVISION BASED SCHEDULING DEVICES AND METHODS

CROSS-REFERENCE TO RELATED APPLICATIONS

This application claims the benefit of priority under 35 U.S.C. §119 from U.S. Provisional Patent Application 61/888,468 filed Oct. 8, 2013, which is incorporated herein by reference in its entirety.

TECHNICAL FIELD

The present description relates generally to data communication, and more particularly, but not exclusively, to optimized WLAN and long-term evolution (LTE) time-division based scheduling for interference avoidance and throughput improvement.

BACKGROUND

Collocated radio-frequency (RF) technologies may suffer from interference to each other that can cause service interruption or degradation of link or packet-level performance. Such interferences can be due to a number of factors, for example, physical proximity, spectral adjacency, imperfection of RF filtering that drifts with temperature, and RF harmonics or intermediate modulations with transmissions associated with multiple radio technologies. Even simultaneous transmission (Tx) and receiving (Rx) of the same RF technology over the same or different carriers, such as long-term evolution (LTE) carrier aggregation and LTE/3G data-plus-2G voice, may encounter the interference problem. For instance, wireless local-area network (WLAN) and Bluetooth (BT) can both operate at 2.4 GHz industrial, scientific, and medical (ISM) band, and cannot be resolved by purely radio-frequency (RF)-level filtering for a single-die WLAN-BT combo chip.

In LTE, time-division duplexing (TDD) transmission and reception are done based on time division such that a ten milli-second (ms) frame is split into one-ms uplink (UL) transmission occasions and one-ms Downlink (DL) transmission occasions. To achieve time division coexistence between LTE and WLAN, BT-special-interest group (SIG) has specified a wireless-coexistence interface-2 (WCI-2) protocol that allows LTE to provide WLAN with LTE UL occasion and LTE DL occasion signals, so that LTE and WLAN transceivers can synchronize their UL/DL transmissions. A WLAN transmitter can perform its WLAN UL transmissions or DL activities when it receives an LTE uplink transmission occasion signal (e.g., a WCI-2 Type 0 message).

BRIEF DESCRIPTION OF THE DRAWINGS

Certain features of the subject technology are set forth in the appended claims. However, for purpose of explanation, several embodiments of the subject technology are set forth in the following figures.

FIGS. 4A-4D illustrate examples of LTE time frames with LTE downlink and uplink signaling to a corresponding WLAN for concurrent LTE and WLAN transmission in accordance with one or more implementations.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations. In one or more instances, well-known structures and components are shown in block diagram form in order to avoid obscuring the concepts of the subject technology.

In on more aspects, methods and implementations for concurrent long-term evolution (LTE) and WLAN uplink (UL) transmission are described. The disclosed solution allows a WLAN transceiver and an LTE transceiver of a device to be able to transmit (UL) data simultaneously. Due to interference problems, the existing solutions do not allow the WLAN transceiver to transmit during LTE downlink (DL) sub-frames of the LTE timeframe (e.g., 10 sub-frames each having one milli-second duration), which accounts for approximately 60% of the LTE time frame. The subject technology allows that 60% of the LTE time frame to be used for WLAN communication activity (e.g., UL or DL), therefore optimizing the LTE and WLAN time division for interference avoidance and throughput improvement.

Figure 1:
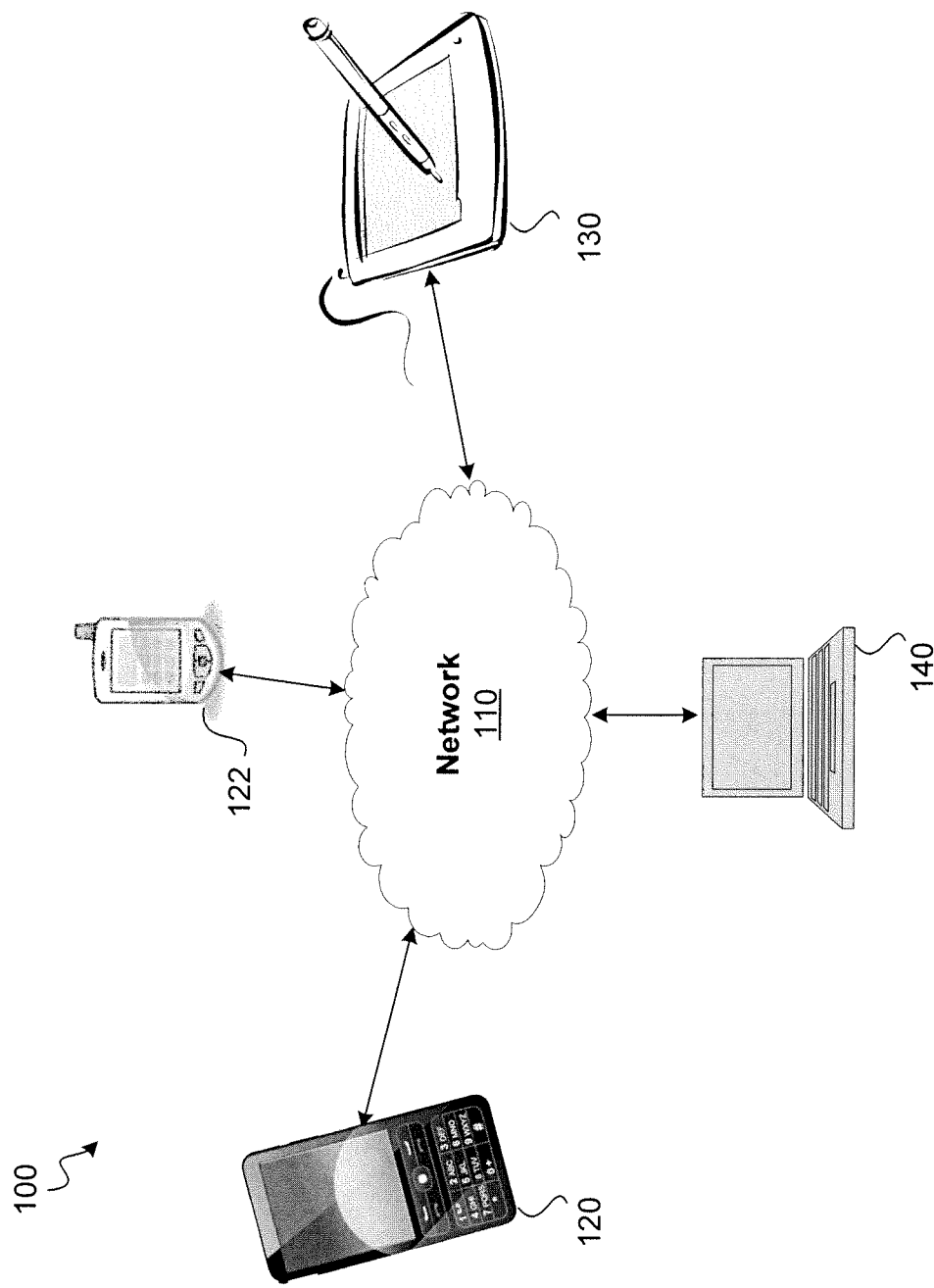
FIG. 1 illustrates an example of a network environment for concurrent long-term evolution (LTE) and WLAN transmission in accordance with one or more implementations.

FIG. 1 illustrates an example of a network environment 100 for concurrent long-term evolution (LTE) and WLAN transmission in accordance with one or more implementations of the subject technology. In the network environment 100, a number of devices such as a smart phone 120, a mobile phone 122, a tablet/laptop 130, a personal computer (PC) 140 are coupled to one another and other network devices via a network 110 (e.g., the Internet, or other networks). The smart phone 120 and/or the tablet/laptop 130 may be WLAN (e.g., Wi-Fi) and LTE enabled. However, due to interference issues that cannot be resolved by filtering, any transmission of the WLAN transceiver in each of these devices may adversely affect the LTE reception (e.g., downlink) of the same device. The WLAN transceivers typically operate in the time-division-duplexing (TDD) mode. The LTE transceivers, however, can operate in both TDD and frequency-division duplexing (FDD) mode. The existing protocol, therefore, dos not allow the WLAN transceiver to transmit during the downlink sub-frames of the LTE time frame. The subject technology provides a new protocol for communication between the LTE transceiver and the WLAN transceiver so that the WLAN transceiver can use a portion of the LTE downlink sub-frame for transmission or reception (e.g., uplink or downlink).

Figure 2:
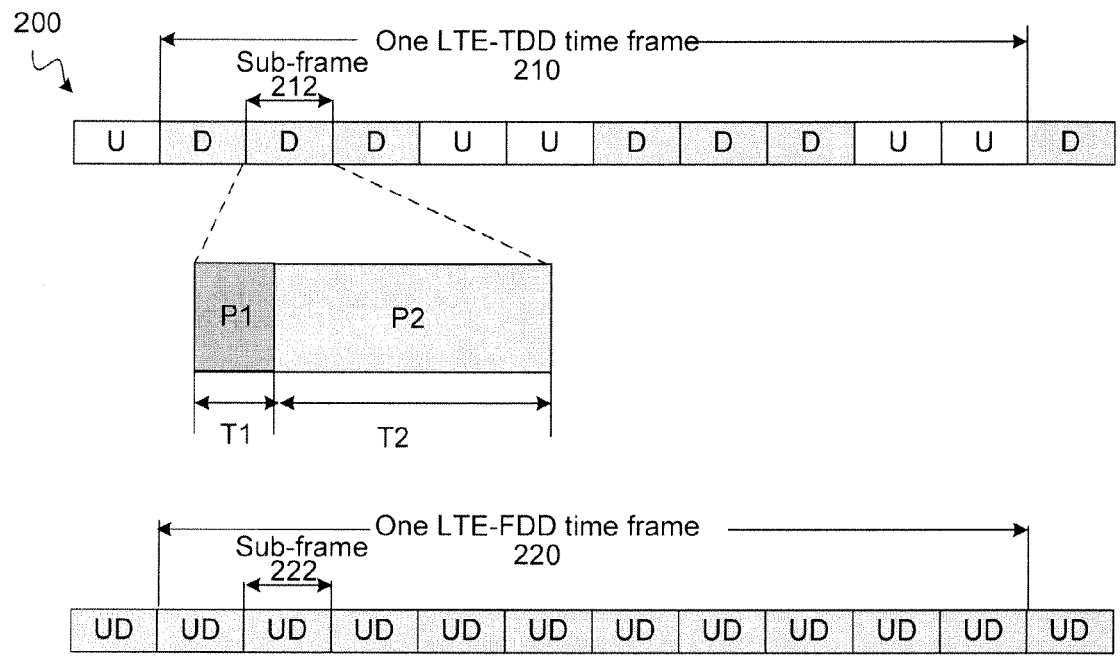
FIG. 2 illustrates an example of LTE time diagrams including an LTE time frame in accordance with one or more implementations.

FIG. 2 illustrates an example of LTE time diagrams 200 including an LTE-TDD time frame 210 and an LTE-FDD time frame 220 in accordance with one or more implementations of the subject technology. The LTE-TDD time diagram 200 shows the LTE-TDD time frame 210 including ten sub-frames 212. The LTE-TDD time frame 210 includes two sets of sub-frames, downlink (DL) sub-frames D and the uplink (UL) sub-frames U. Out of the ten sub-frames of each LTE time frame, four sub-frames are allocated (by the Blue-tooth special-interest group (BT-SIG)) to uplink activities and six sub-frames are allocated to downlink activities as shown if FIG. 2. Each sub-frame may include a first portion P1 that is a physical downlink control channel (PDCCH) and a second portion P2, known as physical downlink shared channel (PDSCH). The PDSCH portion may account for approximately 700 micro-seconds of each sub-frame time (e.g., one milli-second). The PDCCH portion may include information regarding activities during the PDSCH portion of the same sub-frame. For example, the PDCCH portion of an LTE downlink (D) sub-frame 212 may include information indicating whether the LTE transceiver is scheduled to receive packets during the PDSCH portion of the sub-frame 212. The LTE-TDD time frame 220 includes sub-frames 222, during which the LTE transceiver can both transmit (uplink) and receive (downlink) data without interference, as the LTE uplink and downlink are performed at different frequencies and can take place at the same time. According to the existing protocols, the WLAN transceiver, however, is not allowed to transmit during LTE downlink sub-frames, which, in the FDD case includes all LTE sub-frames.

Figure 3:
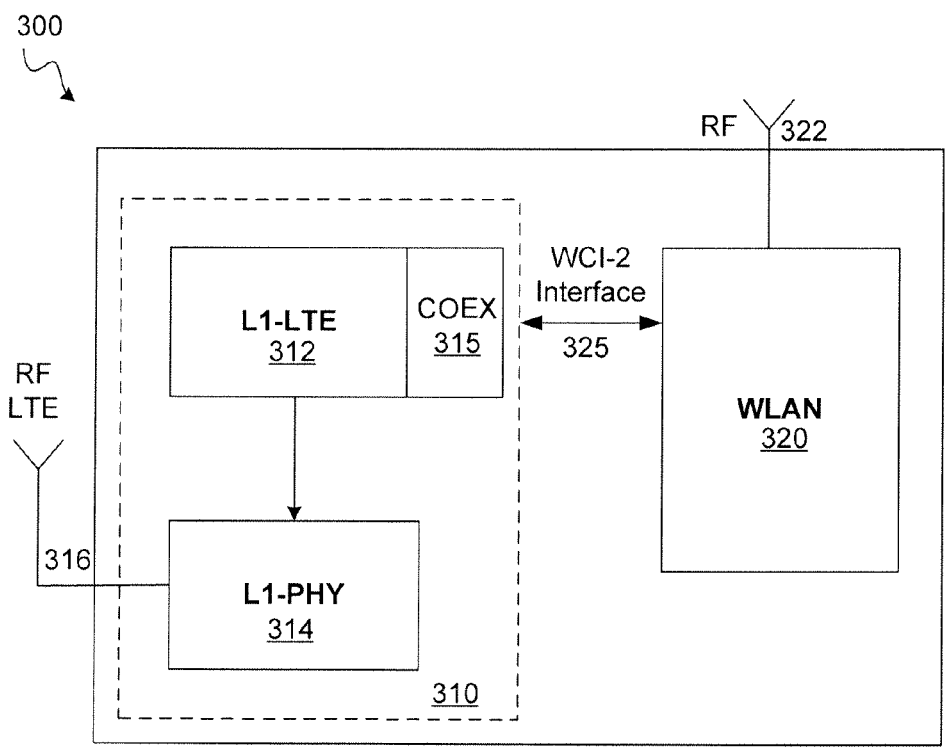
FIG. 3 illustrates an example of a device for concurrent LTE and WLAN transmission in accordance with one or more implementations.
Figure 4C:
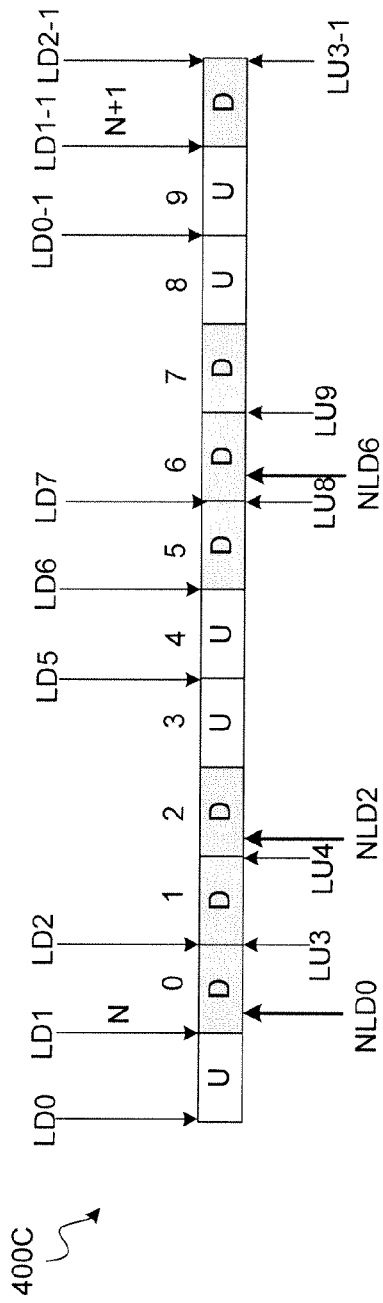
Figure 4D:
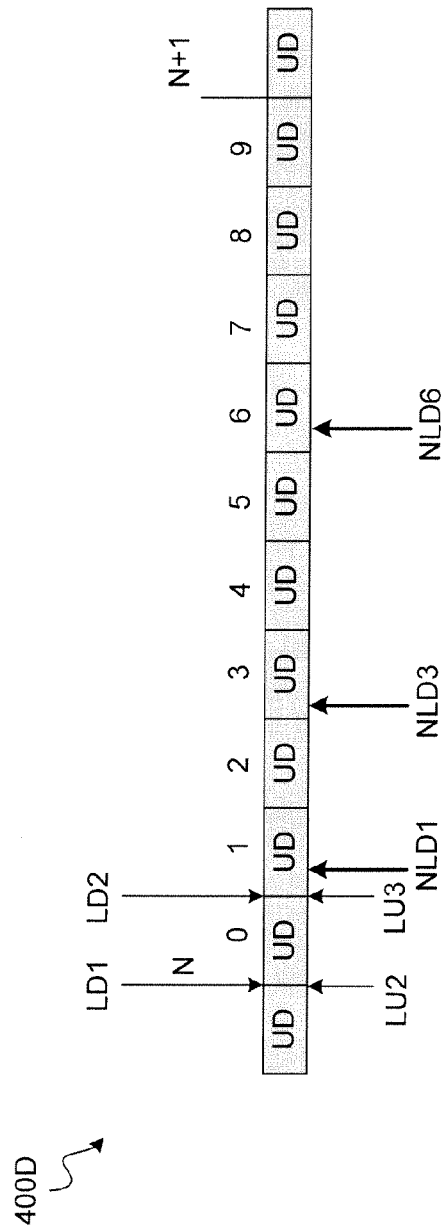

FIG. 3 illustrates an example of a device 300 for concurrent LTE and WLAN transmission in accordance with one or more implementations of the subject technology. Examples of the device 300 include a mobile communication device such as the smart phone 120 or the tablet/laptop 130 of FIG. 1. The device 300 may include a LTE transceiver 310 and a WLAN transceiver 320. In one or more aspects, each of the LTE transceiver 310 and the WLAN transceiver 320 may include their respective LTE radio-frequency (RF) antenna 316 and RF antenna 322. The LTE transceiver 310 may be coupled to the WLAN transceiver 320 via an interface 325 such as a wireless-coexistence interface-2 (WCI-2) that can be controlled by a coexistence (e.g., COEX) module 315. In some aspects, the COEX module 315 may include a software program that may be running in a digital signal processing (DSP) chip. The LTE transceiver 310 may include a layer 1 (L1)-LTE module 312 and an L1-PHY module 314.

In one or more implementations of the subject technology, concurrent LTE and WLAN uplink transmission of the LTE transceiver 310 and the WLAN transceiver 320 can be made possible by the disclosed protocol. The existing protocols allow the WLAN transceiver 320 to uplink only during the LTE uplink (U) sub-frames and has to stop uplink activities during the LTE downlink (D) sub-frames. The disclosed protocol may include determining whether an LTE data downlink by the L1-PHY 314 is scheduled for an LTE downlink sub-frame (e.g., 212 of FIG. 2) of the LTE time frame 210 of FIG. 2, based on the data in a first portion (e.g., PDCCH) of the LTE downlink sub-frame 210. If the determination is made that the LTE data downlink is not scheduled, a message may be communicated from the LTE transceiver 310 to notify the WLAN transceiver that a second portion (e.g., PDSCH) of the LTE downlink sub-frame is available for WLAN UL or DL. The message can be a WCI-2 message (e.g., a WCI-2 type-6 message) communicated using the WCI-2 interface 325. Upon receipt of the WCI-2 message the WLAN transceiver 320 may over-ride the WCI-2 messagetype-0 message that has received one msec ago and immediately start transmission (UL) or reception (DL).

FIGS. 4A-4D illustrate examples of LTE time frames 400A-400D with LTE downlink and uplink signaling to a corresponding WLAN for concurrent LTE and WLAN transmission in accordance with one or more implementations of the subject technology. The LTE time frame 400A shows the LTE-TDD time frame 410 that is similar to the LTE-TDD time frame 210 of FIG. 2, and shows a sample time frame N. According to the existing BT-SIG protocol the LTE transceiver (e.g., 310 of FIG. 3) has to notify the WLAN transceiver (e.g., 320 of FIG. 3) a downlink-look-ahead time (DLT) (e.g., approximately one milli-second) in advance of any downlink sub-frame (e.g. downlink occasion), as shown in a LTE downlink signal 412. The LTE downlink signal 412 may assert before the first downlink (D) sub-frame (e.g., sub-frames 0 and 5) by a time period indicated by DLT. The existing BT-SIG protocol also demands that the LTE transceiver notifies the WLAN transceiver an uplink-look-ahead time (ULT) (e.g., approximately two milli-second) in advance of any uplink sub-frame (e.g. uplink occasion), as shown in an LTE uplink signal 414, which asserts before the first uplink (U) sub-frame (e.g., sub-frames 3 and 8) by a time period indicated by ULT. The LTE downlink and uplink signals 412 and 414 are sent by the LTE transceiver to the WLAN transceiver.

In the LTE time frame 400B, for each individual LTE downlink sub-frame a corresponding messaging time is indicated by an LDi arrow, where i is the sub-frame number. For example, LD0, LD1, LD2, LD5, LD6, and LD7 arrows indicate the messaging time corresponding to the LTE downlink sub-frames 0, 1, 2, 5, 6, and 7. An LUj arrow may correspond to an LTE uplink sub-frame j. For instance, LU3, LU4, LU8, and LU9 arrows indicate the messaging time corresponding to the LTE uplink sub-frames 3, 4, 8, and 9. The messaging time for each LTE downlink sub-frame is approximately one milli-sec (msec) ahead of that downlink sub-frame. The messaging time for each LTE uplink sub-frame is approximately two msec ahead of that uplink sub-frame. The messages are WCI-type-0 messages that are sent from the LTE transceiver to the WLAN transceiver.

In one or more implementations of the subject technology, as shown in the LTE-TDD time frame 400C, in addition to the notifications at times indicated by LD0, LD1, LD2, LD5, LD6, and LD7 arrows corresponding to LTE downlink occasions and LU3, LU4, LU8, and LU9 arrows corresponding to LTE uplink occasions, the LTE transceiver may send no-LTE-downlink (NLD) messages at times indicated by NLD0, NLD2, and NLD6 arrows to the WLAN transceiver (e.g., 320 of FIG. 3). The NLD messages are sent as indications that in the corresponding downlink occasions no actual downlink activity are scheduled. For example, NLD0, NLD2, and NLD6 arrows are shown in the downlink (D) occasions 0, 2, and 6, for which the L1-LTE module 312 of FIG. 3, has determined that no actual downlink activity is scheduled. The L1-LTE module 312 can make the determination by examining the data in the PDCCH portion of the LTE downlink sub-frames (e.g., occasions) 0, 2, and 6. The messages sent may indicate to the WLAN transceiver that the PDSCH portion of the LTE downlink sub-frames 0, 2, and 6 are available for WLAN communication (e.g., uplink or downlink). The messages can be WCI-2 messages (e.g., a WCI-2 type-6 message) communicated using the WCI-2 interface 325 of FIG. 3. Upon receipt of the WCI-2 message the WLAN transceiver 320 may override the WCI-2 messagetype-0 message that has received one msec ago and immediately start leveraging the opportunity to perform transmission (UL) or reception (DL).

In one or more implementations of the subject technology, the LTE transceiver may be a frequency division duplexing (FDD)-LTE transceiver. The LTE-FDD time frame 400D shown in FIG. 4D indicates that, in each LTE-FDD sub-frame, simultaneous LTE data downlink (D) and LTE data uplink (U) activities are allowed. Similar to the LTE-TDD case (e.g., 400C), notifications indicated by the example LD1 and LD2 corresponding to UD occasions 1 and 2 are sent at one msec look-ahead times and notifications indicated by the example LU2 and LU3 corresponding to UD occasions 2 and 3 are sent at two msec look-ahead times. However, as mentioned above, WLAN transmission can interfere with LTE reception (e.g., downlink). Therefore, the existing protocols has no provision for simultaneous WLAN transmission and LTE-FDD activities, as there in no LTE-FDD sub-frames dedicated only to LTE uplink, during which WLAN transceiver can uplink. In one or more aspects of the subject technology, the L1-LTE module 312 may make a determination based on the data in the PDCCH portion of some of the LTE-FDD sub-frames (e.g., 1, 3, and 6) that no LTE downlink activities for these sub-frames are scheduled. In response to the determination, notifications may be sent (e.g., at times corresponding to arrows NLD1, NLD3, and NLD6) to the WLAN transceiver 320 indicating that the PDSCH portion of the LTE-FDD sub-frames 1, 3, and 6 are available for WLAN transmission/reception.

In one or more implementations, the LTE-FDD may be multi-frequency LTE-FDD. In this case, at each frequency a frame may have LTE-FDD sub-frames allocated for simultaneous LTE data uplink and LTE data downlink activities. For the multi-frequency LTE-FDD, the WLAN transmission can corrupt the LTE-FDD reception of various frequencies. Therefore, the WLAN transceiver 320 can transmit concurrently with the LTE transceiver in LTE UD occasions that it is determined that LTE-FDD data downlink is not scheduled, based on the corresponding the PDCCH portion of the LTE-FDD UD sub-frames corresponding to all frequencies. In other words, if only at one of the frequencies of the multiple frequencies, downlink activity is scheduled in an LTE-FDD UD sub-frame, WLAN transmission in that sub-frame cannot be allowed.

Figure 5:
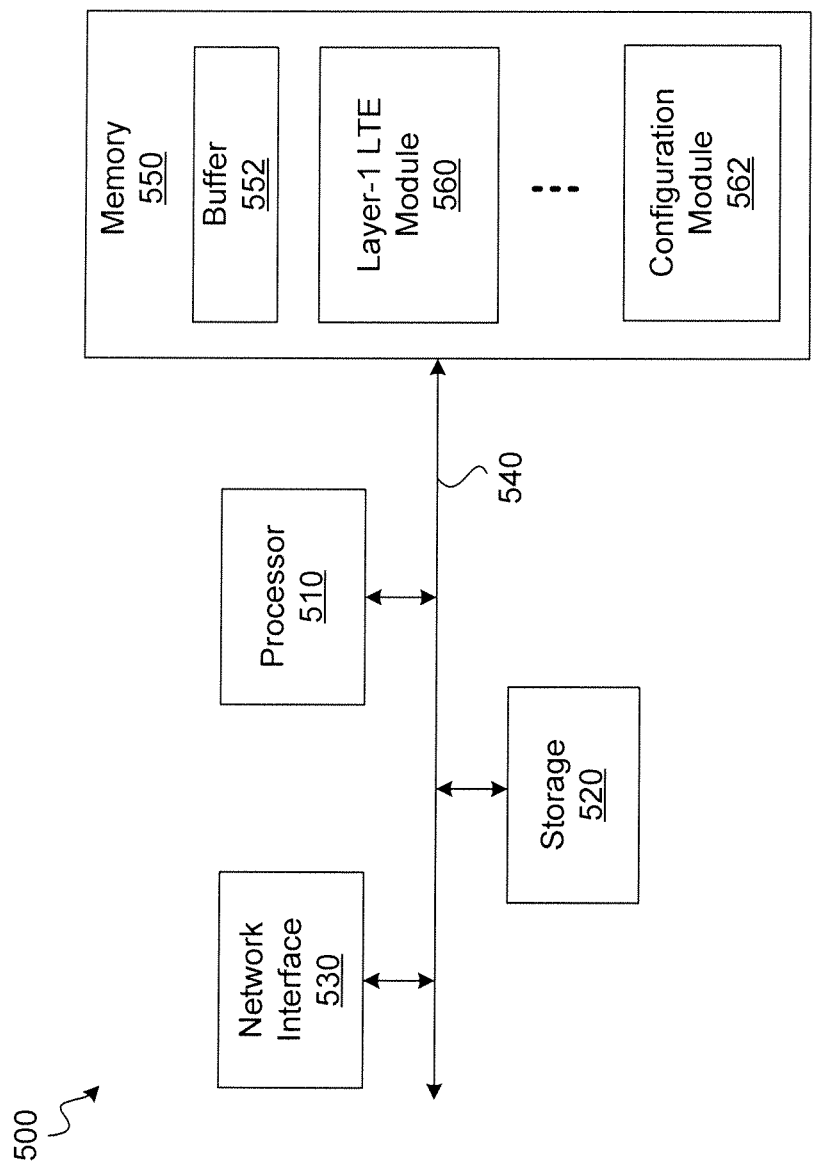
FIG. 5 illustrates an example of a system for concurrent LTE and WLAN transmission in accordance with one or more implementations.

FIG. 5 illustrates an example of a system 500 for concurrent LTE and WLAN transmission in accordance with one or more implementations of the subject technology. The system 500 (e.g., a communication system) may include a processor 510, a storage device 520, a network interface 530, and memory 550, coupled to one another via a bus 540. Examples of the processor 510 may include a general-purpose processor, one or more hardware cores, one or more controllers, a DSP, or any other type of processor. The network interface 530 may perform communications with other devices on the network 110 of FIG. 1. The communications may include receiving/sending data packets and/or control packets. Examples of the memory 550 may include RAM, DRAM, SRAM, T-RAM, Z-RAM, TTRAM, flash memory, or any other type of memory. Examples of the storage device 520 may include a disk drive, flash memory, or any other storage media. The memory 550 may include a buffer 552, and program modules such as Layer-1 program modules including a Layer-1 LTE module 560 and a configuration module 562. The Layer-1 LTE module 560 and the configuration module 562, when executed by a processor (e.g., the processor 510 or a DSP) can perform some or all of the functionalities of the L1-LTE module 312 and the COEX module 315 of FIG. 3, respectively. In other words, in one or more implementations, some or all of the functionalities of the of the L1-LTE module 312 and the COEX module 315 may be implemented in software, which may be included in the software modules 560 and 562 or stored in another storage device and executed by a processor.

Figure 6:
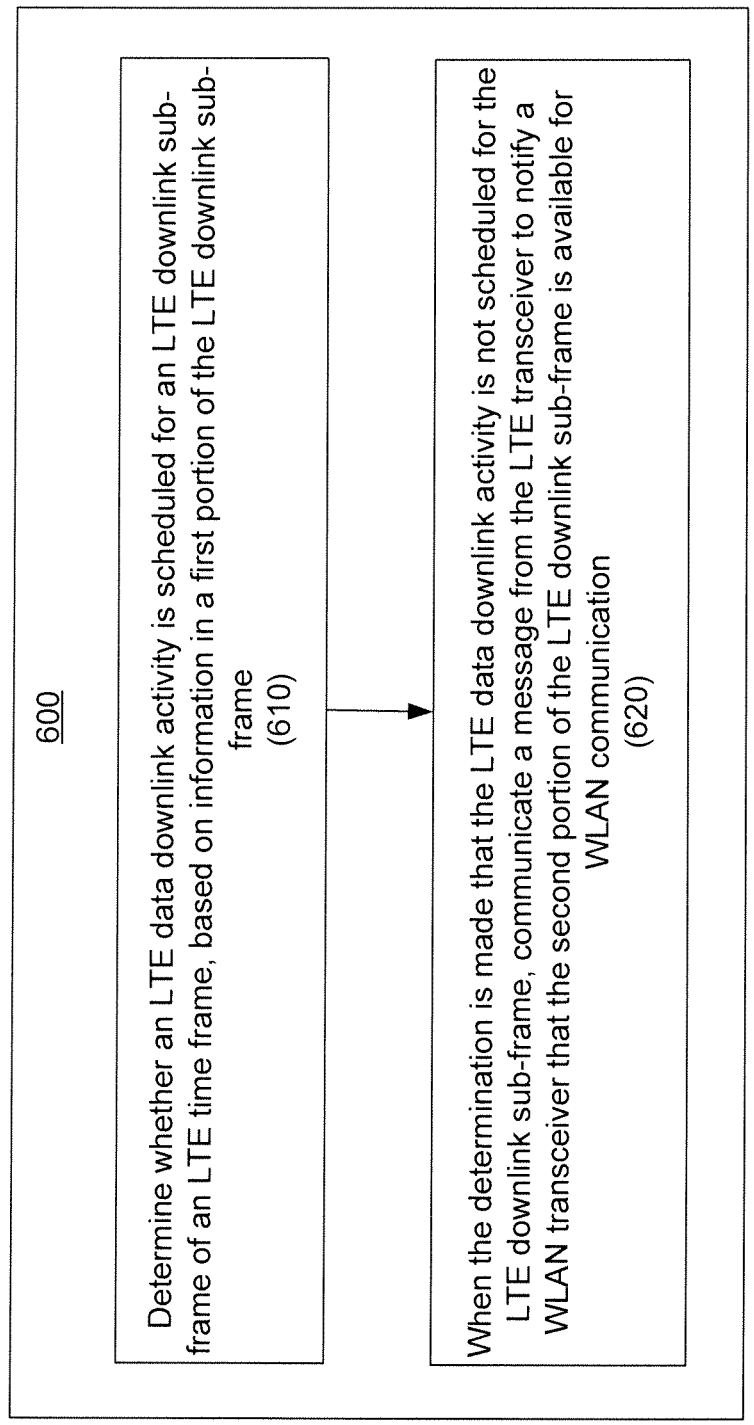
FIG. 6 illustrates an example of a method for concurrent LTE and WLAN transmission in accordance with one or more implementations.

FIG. 6 illustrates an example of a method 600 for concurrent LTE and WLAN transmission in accordance with one or more implementations of the subject technology. The steps of the method 600 do not need to be performed in the order shown and one or more steps may be omitted. Based on information in a first portion (e.g., P1 of FIG. 2) of the LTE downlink sub-frame (e.g., 212 of FIG. 2), determination may be maid whether an LTE data downlink activity is scheduled for an LTE downlink sub-frame (e.g., D of FIG. 2) of an LTE time frame (e.g., 210 of FIG. 2) (610). The LTE time frame includes a number of LTE downlink sub-frames, and each LTE downlink sub-frame includes the first portion (e.g., P1 of FIG. 2) and a second portion (e.g., P2 of FIG. 2), and the first portion can provide the information that indicates whether the LTE data downlink activity is scheduled for the second portion of that LTE sub-frame. When the determination is made that the LTE data downlink activity is not scheduled for the LTE downlink sub-frame, a message from the LTE transceiver (e.g., 310 of FIG. 3) may be communicated to notify a WLAN transceiver (e.g., 320 of FIG. 3) that the second portion of the LTE downlink sub-frame is available for WLAN communication (620).

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature of the subject technology.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

Those of skill in the art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, and methods have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for facilitating concurrent long-term evolution (LTE) and wireless local-area network (WLAN) uplink transmission, the method comprising:
   determining whether an LTE data downlink activity is scheduled for an LTE downlink sub-frame of an LTE time frame, based on information in a first portion of the LTE downlink sub-frame, wherein the LTE time frame comprises a plurality of LTE downlink sub-frames, and each LTE downlink sub-frame includes the first portion and a second portion, and wherein the first portion provides information that indicates whether the LTE data downlink activity is scheduled for the second portion of the corresponding LTE downlink sub-frame; and
   when the determination is made that the LTE data downlink activity is not scheduled for the LTE downlink sub-frame, sending an LTE-downlink occasion indication to a WLAN transceiver approximately one milli-second in advance to notify that the second portion of the LTE downlink sub-frame is available for WLAN communication.

2. The method of claim 1, wherein the LTE transceiver and the WLAN transceiver are coexisting on a single device, wherein the single device is a mobile communication device.

3. The method of claim 1, wherein the first portion of the LTE downlink sub-frame comprises a physical downlink control channel (PDCCH) portion, and wherein the second portion of the LTE downlink sub-frame comprises a physical downlink shared channel (PDSCH) portion.

4. The method of claim 1, wherein the WLAN communication comprises one of WLAN uplink or WLAN downlink.

5. The method of claim 1, further comprising sending an LTE-uplink occasion indication to the WLAN transceiver approximately two milli-second in advance, wherein sending LTE-uplink occasion indication comprises sending a wireless-coexistence interface (WCI)-2 type-0 message.

6. The method of claim 1, wherein sending the LTE-downlink occasion indication comprises sending a wireless-coexistence interface (WCI)-2 type-0 message.

7. The method of claim 1, wherein communication of the message comprises communicating a wireless-coexistence interface (WCI)-2 message, and wherein communicating the message comprises communicating a WCI-2 type-6 message.

8. The method of claim 7, wherein communicating WCI-2 type-6 message causes the WLAN transceiver to override 1 WCI-2 type-0 message received approximately one millisecond ago and to immediately start WLAN uplink transmission and use the second portion of the LTE downlink sub-frame for WLAN uplink transmission.

9. The method of claim 1, wherein the LTE time frame comprises an LTE-frequency-division duplexing (FDD) time frame, wherein the LTE downlink sub-frame comprises an LTE-FDD sub-frame, and wherein simultaneous LTE data downlink and LTE data uplink activities are allowed in LTE-FDD standard.

10. The method of claim 1, wherein the LTE time frame comprises a multi-frequency LTE-FDD time frame with separate LTE-FDD sub-frames allocated for simultaneous LTE data uplink and LTE data downlink activities at each frequency, and wherein determining whether the LTE data downlink is scheduled comprises determining whether simultaneous LTE-FDD data downlink is scheduled for the LTE-FDD sub-frame of all frequencies.

11. A device with concurrent long-term evolution (LTE) and wireless local-area network (WLAN) uplink transmission, the device comprising:
a WLAN transceiver; and
an LTE transceiver coupled to the WLAN transceiver via an interface, the LTE transceiver comprising an LTE Layer-1 module configured to:
determine whether an LTE data downlink activity is scheduled for an LTE downlink sub-frame of an LTE time frame, based on information in a first portion of the LTE downlink sub-frame; and
when determination is made that the LTE data downlink activity is not scheduled for the LTE downlink sub-frame, send an LTE-downlink occasion indication to the WLAN transceiver approximately one milli-second in advance to notify the WLAN transceiver that the second portion of the LTE downlink sub-frame is available for WLAN communication,
wherein the LTE time frame comprises a plurality of LTE downlink sub-frames, and each LTE downlink sub-frame includes the first portion and a second portion, and wherein the first portion provides information that indicates whether the LTE data downlink activity is scheduled for the second portion of the corresponding LTE downlink sub-frame.

12. The device of claim 11, wherein the first portion of the LTE downlink sub-frame comprises a physical downlink control channel (PDCCH) portion, and wherein the second portion of the LTE downlink sub-frame comprises a physical downlink shared channel (PDSCH) portion.

13. The device of claim 11, wherein the LTE Layer-1 module is configured to send an LTE-uplink occasion indication to the WLAN transceiver approximately two milli-second in advance, wherein sending LTE-uplink occasion indication comprises sending a wireless-coexistence interface (WCI)-2 type-0 message.

14. The device of claim 11, wherein sending the LTE-downlink occasion indication comprises sending a wireless-coexistence interface (WCI)-2 type-0 message.

15. The device of claim 11, wherein the LTE Layer-1 module is configured to communicate a wireless-coexistence interface (WCI)-2 message through the interface to the WLAN transceiver, and wherein communicating the WCI-2 message through the interface comprises communicating a WCI-2 type-6 message.

16. The device of claim 15, wherein communicating WCI-2 type-6 message causes the WLAN transceiver to override the WCI-2 type-0 message received approximately one milli-second ago and to immediately start WLAN uplink transmission and use the second portion of the LTE downlink sub-frame for WLAN uplink transmission.

17. The device of claim 11, wherein the LTE time frame comprises an LTE-frequency-division duplexing (FDD) time frame, wherein the LTE downlink sub-frame comprises an LTE-FDD sub-frame, and wherein simultaneous LTE data downlink and LTE data uplink activities are allowed in LTE-FDD standard.

18. The device of claim 11, wherein the LTE time frame comprises a multi-frequency LTE-FDD time frame with separate LTE-FDD sub-frames allocated for simultaneous LTE data uplink and LTE data downlink activities at each frequency, and wherein the LTE Layer-1 module is configured to determine whether the LTE data downlink is scheduled by determining whether simultaneous LTE-FDD data downlink is scheduled for the LTE-FDD sub-frame of all frequencies.

19. A communication system comprising:
memory;
one or more processors coupled to the memory and configured to execute one or more program modules to perform:
determining whether a long-term evolution (LTE) data downlink activity is scheduled for an LTE downlink sub-frame of an LTE time frame, based on information in a first portion of the LTE downlink sub-frame, wherein the LTE time frame comprises a plurality of LTE downlink sub-frames, and each LTE downlink sub-frame includes the first portion and a second portion, and wherein the first portion provides information that indicates whether the LTE data downlink activity is scheduled for the second portion of the corresponding LTE downlink sub-frame; and
when the determination is made that the LTE data downlink activity is not scheduled for the LTE downlink sub-frame, sending an LTE-downlink occasion indication to a WLAN transceiver approximately one milli-second in advance to notify the WLAN transceiver that the second portion of the LTE downlink sub-frame is available for WLAN communication.

20. The communication system of claim 19, wherein the first portion of the LTE downlink sub-frame comprises a physical downlink control channel (PDCCH) portion, wherein the second portion of the LTE downlink sub-frame comprises a physical downlink shared channel (PDSCH) portion, wherein the LTE time frame comprises an LTE-frequency-division duplexing (FDD) time frame, wherein the LTE downlink sub-frame comprises an LTE-FDD sub-frame, and wherein simultaneous LTE data downlink and LTE data uplink activities are allowed in LTE-FDD standard.

* * * * *